June 26, 1962 L. BUDTS ETAL 3,041,477
MULTIVIBRATOR CIRCUIT ARRANGEMENT
Filed July 27, 1959 7 Sheets-Sheet 1

LUCIEN BUDTS
FRANÇOIS DE SENIGON DE ROUMEFORT
JEANNE BALIGANT
*Inventors*
BY Karl F. Ross
*Agent*

June 26, 1962  L. BUDTS ETAL  3,041,477
MULTIVIBRATOR CIRCUIT ARRANGEMENT
Filed July 27, 1959  7 Sheets-Sheet 2

LUCIEN BUDTS
FRANÇOIS DE SENIGON DE ROUMEFORT
JEANNE BALIGANT
Inventors
BY  *Karl F. Ross*
Agent June 26, 1962   L. BUDTS ETAL   3,041,477
MULTIVIBRATOR CIRCUIT ARRANGEMENT Filed July 27, 1959   7 Sheets-Sheet 3

LUCIEN BUDTS
FRANÇOIS DE SENIGON DE ROUMEFORT
JEANNE BALIGANT
Inventors
BY  *Karl F. Ross*
Agent

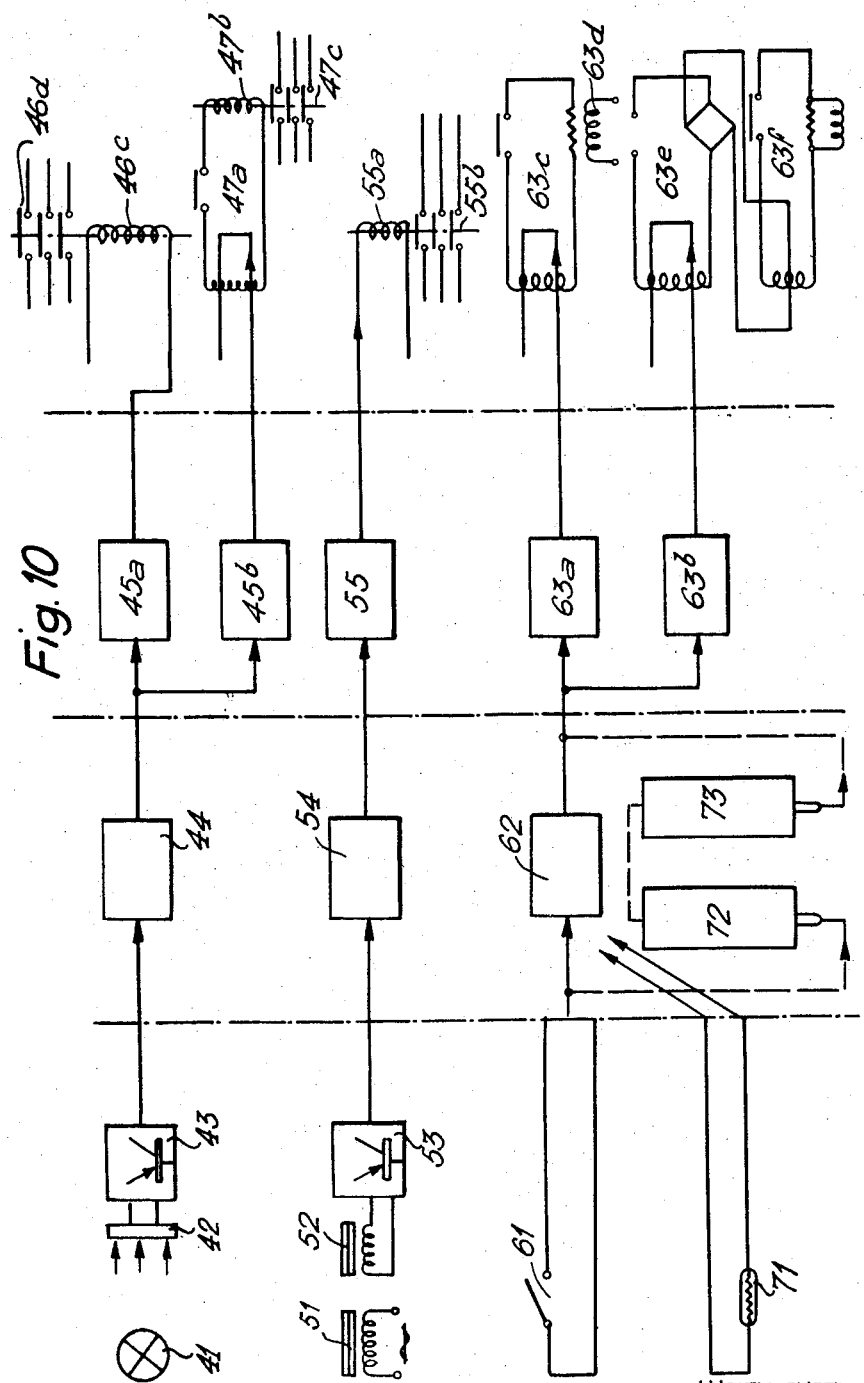

June 26, 1962   L. BUDTS ETAL   3,041,477
MULTIVIBRATOR CIRCUIT ARRANGEMENT
Filed July 27, 1959   7 Sheets-Sheet 5
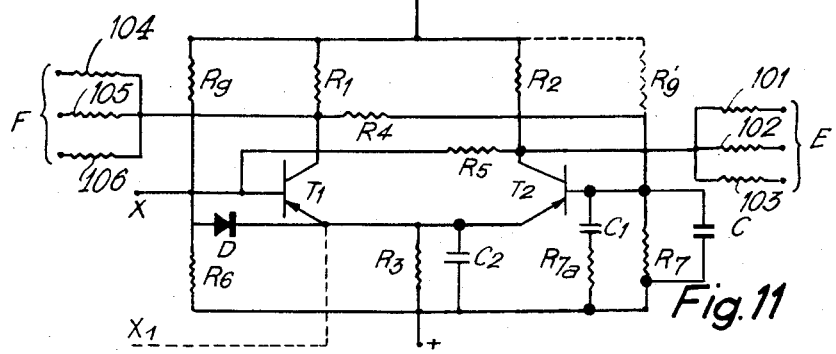
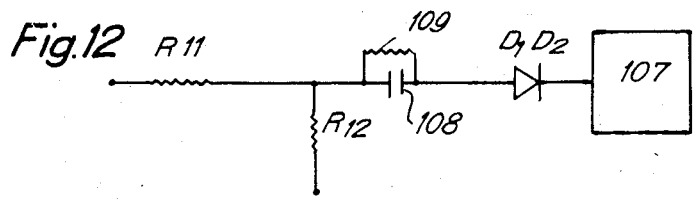
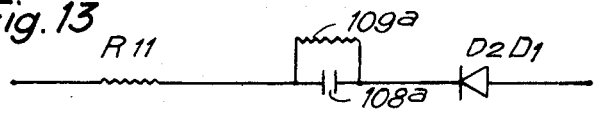
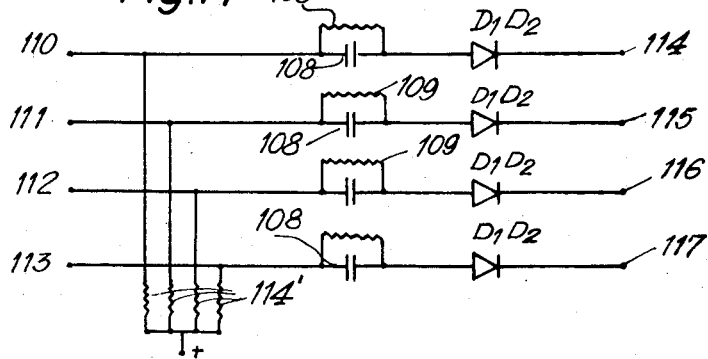
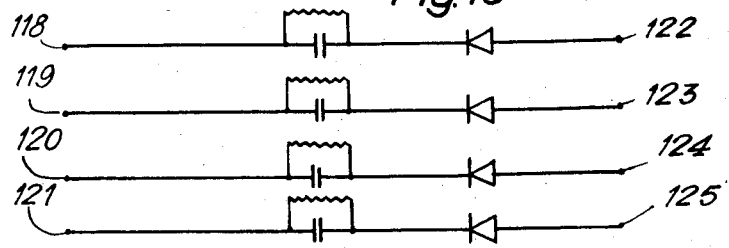
LUCIEN BUDTS
FRANÇOIS
  DE SENIGON
  DE ROUMEFORT
JEANNE BALIGANT
         Inventors
BY
         Agent June 26, 1962   L. BUDTS ETAL   3,041,477
MULTIVIBRATOR CIRCUIT ARRANGEMENT
Filed July 27, 1959   7 Sheets-Sheet 6

LUCIEN BUDTS
FRANÇOIS DE SENIGON DE ROUMEFORT
JEANNE BALIGANT
Inventors
BY Karl F. Ross
Agent June 26, 1962 L. BUDTS ETAL 3,041,477
MULTIVIBRATOR CIRCUIT ARRANGEMENT
Filed July 27, 1959 7 Sheets-Sheet 7
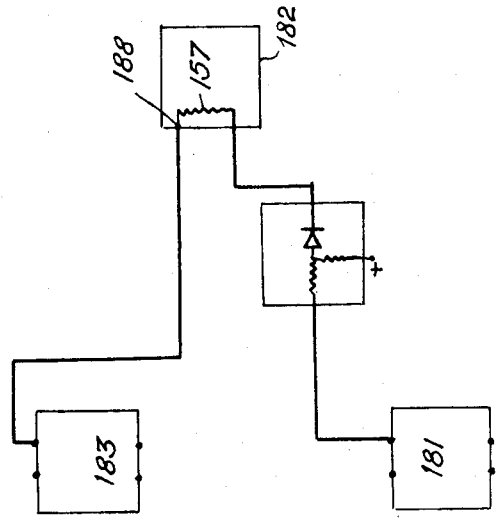
Fig. 21
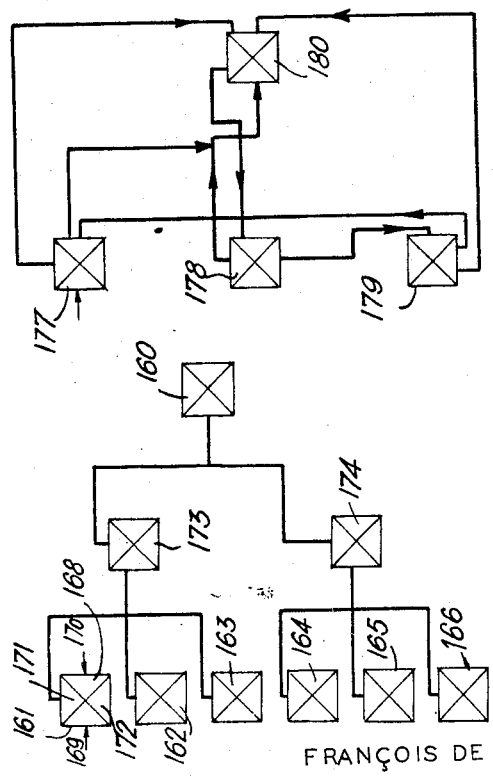
Fig. 20
Fig. 18
LUCIEN BUDTS
FRANÇOIS DE SENIGON DE ROUMEFORT
JEANNE BALIGANT
*Inventors*
BY *Karl F. Ross*
*Agent*

United States Patent Office 3,041,477
Patented June 26, 1962

3,041,477
MULTIVIBRATOR CIRCUIT ARRANGEMENT
Lucien Budts, 147 Rue de Clignancourt, Paris 18, France, and Francois de Senigon de Roumefort and Jeanne de Senigon de Roumefort, née Baligant, both of 4 Rue de Calais, Paris 9, France
Filed July 27, 1959, Ser. No. 829,699
Claims priority, application France Aug. 8, 1958
12 Claims. (Cl. 307—88.5)

The present invention relates to electrical apparatus employing transistors for use in place of electromechanical relays and similar devices.

It is known that electromechanical relays, contactors and other similar devices have a number of disadvantages such as rapid wear and oxidation of contacts, failure due to dirty contacts and so on.

The invention contemplates replacing such relays by static devices such as control functional units, comprising point-contact or junction transistors which by their nature are free from the disadvantages mentioned above and can operate without deterioration for an indefinite period of time.

These devices furnish a potential on an On/Off basis, which when amplified by amplifier functional units may actuate receiving devices of any kind directly or through the intermediary of magnetic amplifiers.

The various features and advantages of the invention will be readily understood from the following description of several exemplary embodiments illustrated in the accompanying drawing, in which.

Figure 3:
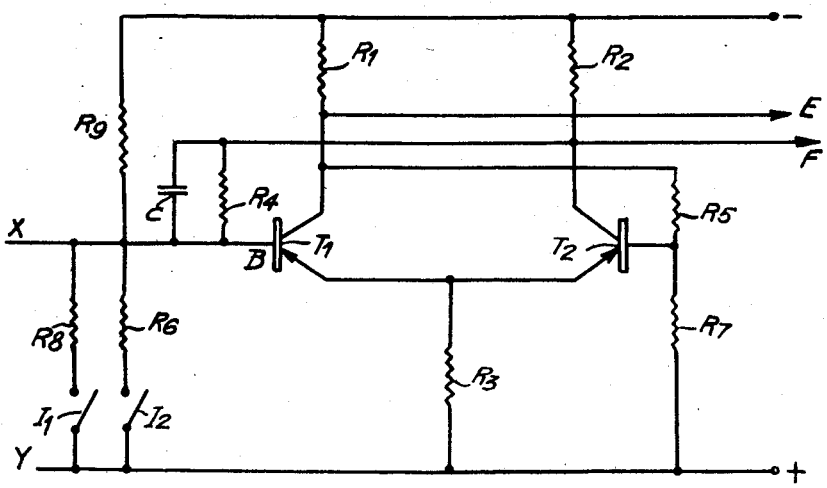
FIGURE 3 is a diagram of a functional unit.
Figure 4:
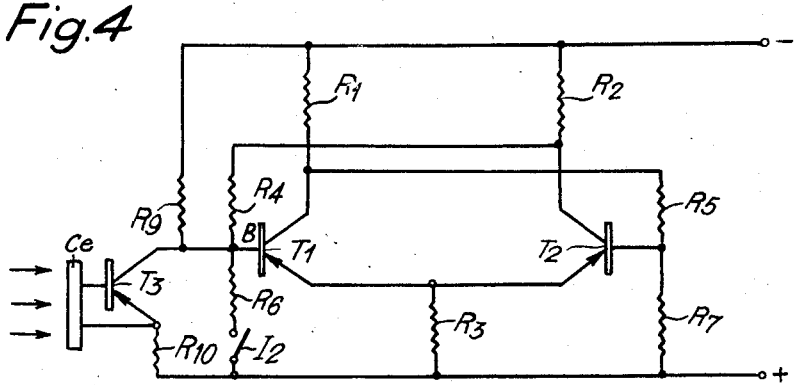
Figure 5:
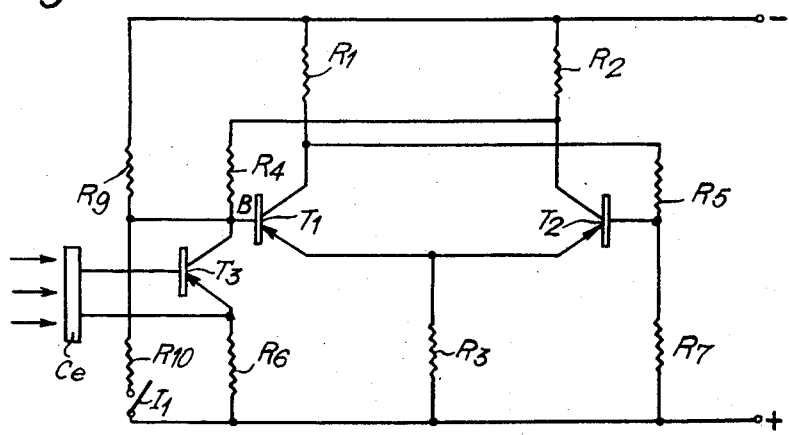
Figure 6:
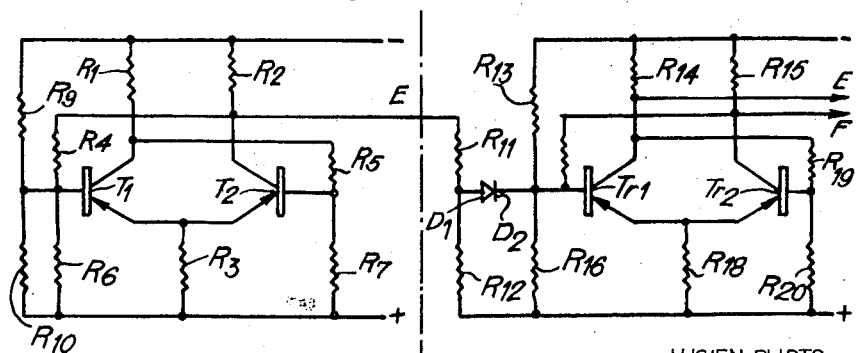
Figure 7:
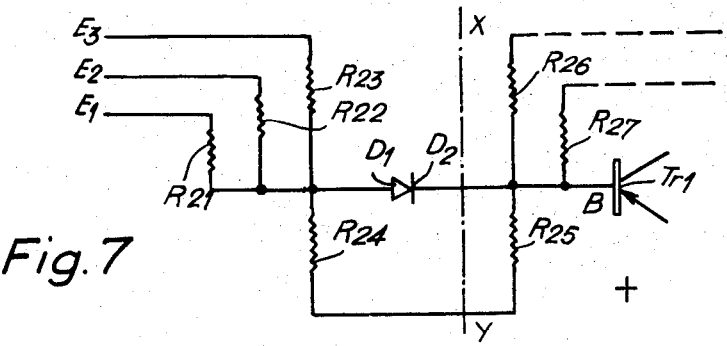
Figure 8:
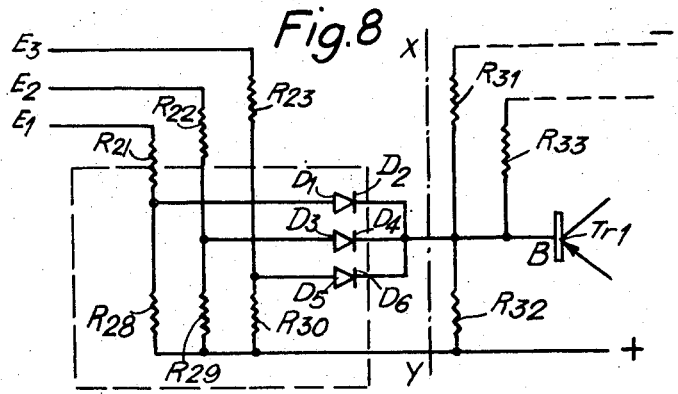
Figure 9:
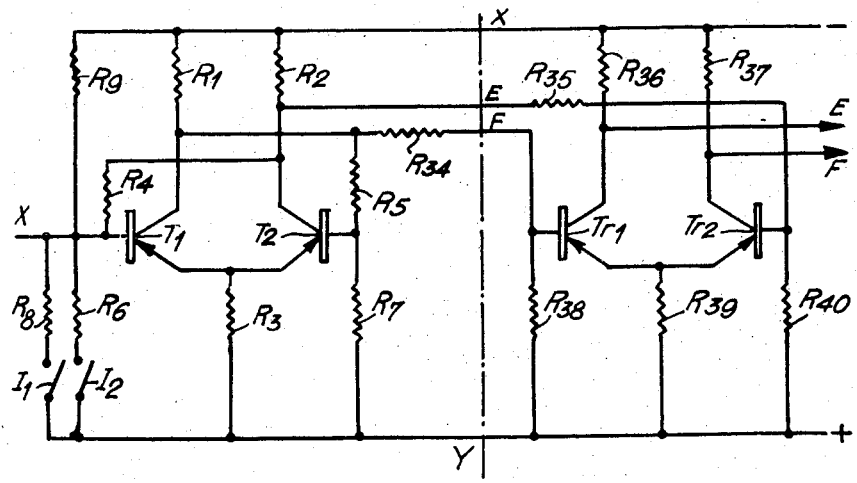
Figure 16:
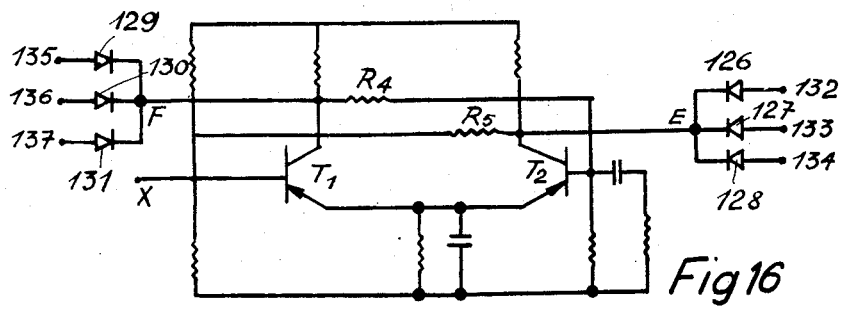
Figure 17:
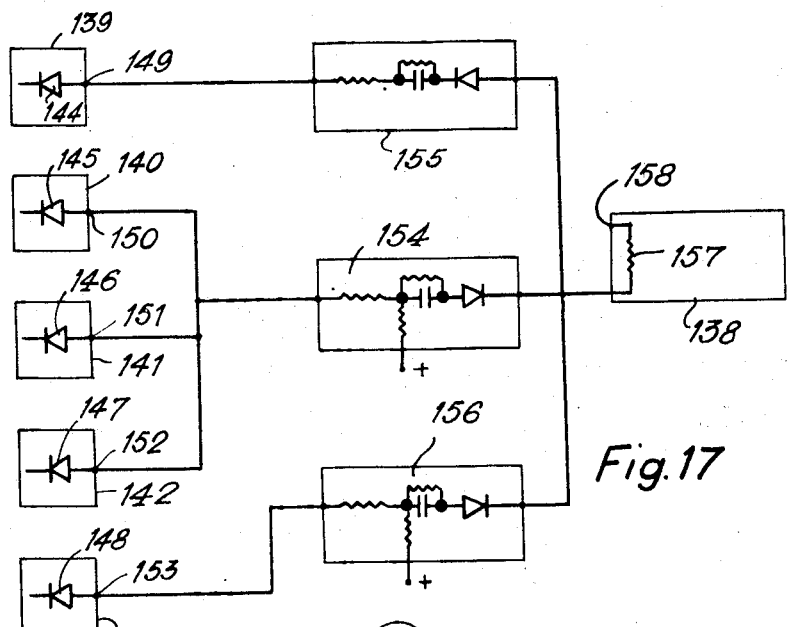
Figure 19:
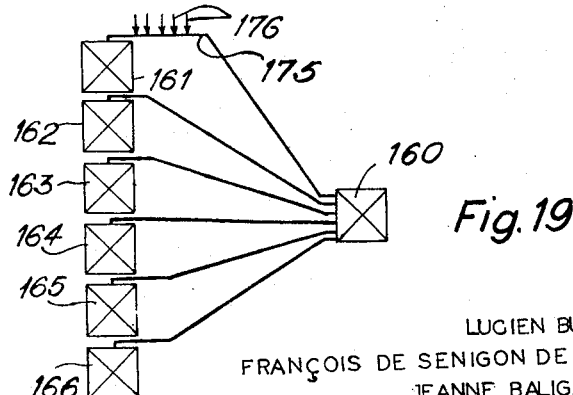

FIGURE 4 shows an arrangement similar to that of FIGURE 3 but actuated by a photocell, FIGURE 5 is a modification of the arrangement of FIGURE 4, FIGURE 6 is a circuit of two similar arrangements interconnected, FIGURE 7 is a circuit employing several control functional units in series, FIGURE 8 is a circuit employing several units in parallel, FIGURE 9 is the circuit of a control unit controlling an amplifier unit, FIGURE 10 is the circuit of a combined arrangement showing the application of functional units to the control of various utilisation devices, FIGURE 11 is a schematic representation of a functional unit or electronic switching relay of improved form, FIGURE 12 is a circuit diagram of a pulse signal control functional unit which may replace the level signal system of FIGURE 7, FIGURE 13 is a circuit diagram of a pulse counter-order control unit, FIGURE 14 is a circuit diagram of a composite system derived from FIGURE 12, FIGURE 15 is a circuit diagram of similar system derived from FIGURE 13, FIGURE 16 is a further schematic representation of the functional unit of FIGURE 11 employing diodes in place of resistors, FIGURE 17 is a schematic representation of a system involving interaction between various functional units, FIGURE 18 is a schematic representation of a system of mixing signals emanating from six functional units through two signal-control units, FIGURE 19 is a schematic representation of a system of mixing signals emanating from $n$ functional units transmitting their signals through diodes and not resistors, FIGURE 20 is a schematic representation of complex interconnections between functional units, and FIGURE 21 shows a modification of the system of FIGURE 20.

Figure 1:
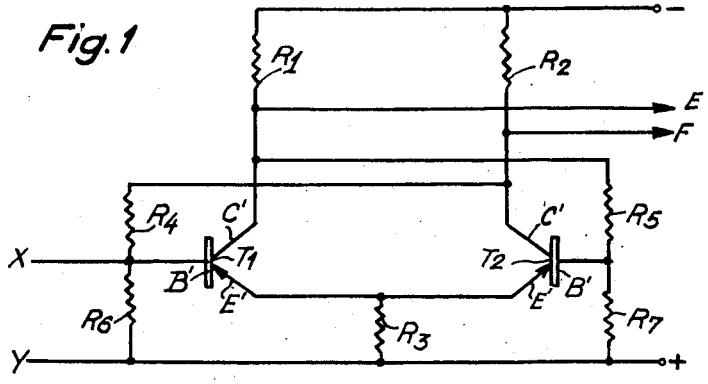
FIGURE 1 is a symmetrically arranged circuit of transistors and resistors.

Referring to FIGURE 1, the arrangement shown is completely symmetrical, the resistors being equal in pairs, for instance $R_1=R_2$, $R_4=R_5$ and $R_6=R_7$. In this figure $T_1$ and $T_2$ represent transistors, $B'$ indicating the base, $E'$ the emitter, and $C'$ the collector. Resistor $R_3$ is always traversed by a constant current and the potential difference across it remains constant.

Considering the case where $T_1$ is conductive, that is to say the potential at the collector $C'$ with respect to the emitter $E$ is at a minimum level, say about 0.2 volt. In this case the resistors $R_5$ and $R_7$ are subjected to a potential difference which is that across $R_3$ plus 0.2 volt. The base $B'$ of $T_2$ is then at a potential slightly positive with respect to the emitter $E'$ of $T_2$, the resistors $R_5$ and $R_7$ being so chosen that this condition is fulfilled. $T_2$ is thus non-conducting; the voltage drop between $E'$ and $C'$ of this transistor attains its maximum value and the potential difference across $R_2$ is substantially zero.

The voltage across $R_4$ is, on the other hand, a maximum, the resistors $R_4$, $R_6$ applying to the base $B'$ of $T_1$ a potential which is negative with respect to the emitter so that a current flows in the base circuit of this transistor.

The resistors $R_4$, $R_6$ are so chosen that under these conditions the base control current will be sufficient to render the transistor completely free to conduct.

The switching operation of such an arrangement will now be considered.

If the negative potential of $B'$ is reduced by the action of an external circuit XY, the current controlled by $T_1$ diminishes as does the voltage drop across $R_1$. The flow of current in $R_5$, $R_7$ increase magnitude and, at a certain increase of this current, transistor $T_2$ begins to conduct whilst the voltage drop across $R_2$ increases.

Simultaneously the flow of current in $R_4$, $R_6$ decreases and the base current of transistor $T_1$ decreases also. The effect is cumulative, the arrangement switches over, $T_1$ is non-conductive and $T_2$ is conductive. The voltage drop across to $R_2$ becomes a maximum and that across $R_1$ becomes a minimum.

It will be understood that an opposite variation at XY will produce the opposite effect and restore the circuit to its initial state.

Figure 2:
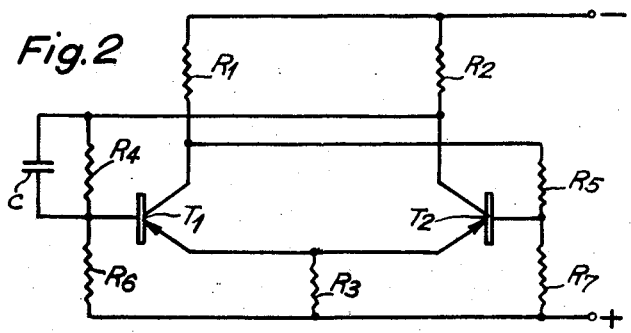
FIGURE 2 is a modification of FIGURE 1 with a condenser added.

It is apparent that an arrangement of this nature, if it is truly symmetrical, will take up either state upon being switched on but since the object of the invention is to replace electromechanical relays it is necessary to ensure that the circuit will always assume one state when switched on. This is done by connecting a capacitor C across the resistor $R_4$ (FIGURE 2).

When it is switched on the circuit is now unbalanced and has a preferred stable state in which transistor $T_1$ conducts. The capacitor C moreover has the advantage of bypassing variations in voltage across at $R_2$ and of providing a greater switching sensitivity. There is thus provided a switching relay responsive to an applied signal and capable of remaining in a switched state. This is analogous to an electromechanical relay with locking circuit.

An even better relay should not only switch in response to an applied signal but also revert to its initial state upon cessation of such signal.

This brings one to the arrangement of FIGURE 3 to which a resistor $R_0$ has been added. In this figure the references have the same significance as in FIGURES 1 and 2 and in addition $I_1$ and $I_2$ denote circuit-breaker contacts.

The resistors $R_6$, $R_4$, $R_9$ are so chosen that there is obtained a balanced arrangement, identical with the previous one, which has the same switching characteristics and in which the capacitor C determines the initial state.

Take the case where $I_2$ is closed and $I_1$ is open and consider the following conditions:

Condition 1: transistor $T_2$ is conductive, transistor $T_1$ is non-conductive, the relay is in its unoperated state.

Condition 2: transistor $T_2$ is conductive, transistor $T_1$ is non-conductive, the relay is in its operated state.

In this latter condition the opening of contact $I_2$ produces unbalance in the circuit, a negative signal appears at B which corresponds to the interruption of the locking circuit, and the relay returns to its unoperated state. The resistor $R_9$, which was not present in the previously described circuit, ensures the passing of a current by the base of transistor $T_1$ and the device switches.

The contact $I_2$ being open (FIGURE 3), the closing of $I_1$ puts the resistor $R_8$ in circuit, the value of $R_8$ being such that the change in potential at the base of $T_1$ becomes such that the current flowing in the base circuit decreases so as to initiate switching.

Thus if $I_1$ is open the closing of $I_2$ does not produce any change, i.e. the circuit remains balanced, but the closing of $I_1$ produces unbalance and the relay switches to its operated state.

The opening of contact $I_1$ does not produce switching, i.e. the circuit remains balanced.

The opening of $I_2$ restores the relay to its unoperated state, the circuit being unbalanced.

The contact $I_2$ being open, the closing of $I_1$ switches the relay to its operated state whilst its opening restores the relay to its unoperated state.

There is thus provided an electronic relay having the operational features of a conventional electro-mechanical relay.

The arrangement can, however, be controlled otherwise than by the manipulation of contacts.

The resistor $R_8$ may be replaced by a transistor $T_3$ which plays the part of the contact $I_1$ (FIGURES 4 and 5). This transistor $T_3$ is connected to a photocell $C_e$ which when sufficiently illuminated initiates conduction by $T_3$, the potential at the base B of $T_1$ is changed and the relay switches over. The transistor $T_3$ effectively replaces the contact $I_1$ in putting the relay circuit into its operated state.

It is also possible to replace the photocell by a coil subjected to a variable or alternating magnetic field. For example by causing a permanent magnet to pass in front of the coil, currents are induced in the coil which can act upon the transistor $T_3$.

Combinations of this type may be employed in series or in parallel with or without interconnection. Transistors such as $T_3$ may thus receive electrical signals of voltage or current form.

It will readily be seen from consideration of FIGURE 3 that the switching produces a potential variation at F. If this variation is applied to the following relays there is produced an inter-relay function (FIGURE 6).

In the unoperated state the potential at $R_2$ is a minimum and the resistors $R_{11}$, $R_{12}$ apply to the diode $D_1$, $D_2$ a potential more negative at $D_1$ than at $D_2$.

In the operated state the potential at $R_2$ is a maximum and close to that at $D_2$, the diode $D_1$, $D_2$ becomes conductive and the circuit switches over (FIGURE 6).

In FIGURE 6 the resistors $R_1$–$R_5$ and $R_7$ correspond to those of FIGURE 1, $T_1$ and $T_2$ are the transistors in the left hand part of the circuit and $Tr_1$, $Tr_2$ are those in the right hand part of the circuit. In this latter part the resistors correspond to those in the left hand part, $R_{13}$ corresponding to $R_9$, $R_{14}$ to $R_1$, $R_{15}$ to $R_2$, $R_{19}$ to $R_5$ and so on.

It will be appreciated that the potentials appearing at point F may control several relays. The point E can also be used for this purpose, the functions at this point being the inverse of those at point F. Moreover several relays may be employed to control one final relay.

FIGURE 7 shows an arrangement making use of this principle. In this figure $E_1$, $E_2$, $E_3$ are points where the variable potentials are applied to the circuit through resistors $R_{21}$–$R_{24}$ and the diode $D_1$, $D_2$ before reaching the transistor $Tr_1$, then to the following circuit through resistors $R_{25}$–$R_{27}$.

It is necessary that all the variations at $E_1$, $E_2$, $E_3$ take place for the relay to switch.

It is possible also to use the parallel arrangement shown in FIGURE 8. In this figure the same references indicate the same parts as in FIGURE 7. In addition supplementary diodes are indicated by $D_3$, $D_4$ and $D_5$, $D_6$ and resistors $R_{28}$ to $R_{30}$ replace the resistor $R_{24}$ of FIGURE 7. Resistors $R_{31}$ to $R_{33}$ correspond respectively to resistors $R_{25}$ to $R_{27}$ of FIGURE 7. In both figures the lines X, Y indicate the junction of two separate circuits connected together.

Variations in potential at points E and F may feed amplifiers which allow control, through external circuits, of alternating current by transducers. Equally the operation of large contactors may be controlled by energising their coils either wholly or not at all on an On/Off basis.

FIGURE 9 shows another possible arrangement of functional units. In this figure the left-hand part is identical with FIGURE 3, the resistors $R_{34}$ and $R_{35}$ serving to link the left- and right-hand parts. In the latter part the resistors $R_{36}$ to $R_{40}$ correspond respectively to the resistors $R_1$, $R_2$, $R_6$, $R_3$ and $R_7$ whilst the transistors $Tr_1$ and $Tr_2$ correspond to transistors $T_1$ and $T_2$. The points E and F are the output terminals of the arrangement.

In FIGURE 10 there are shown several contactors or other members actuated by control arrangements, which will be described later, through the intermediary of functional units. The upper part of the figure shows a control circuit actuated in response to light, beneath it is shown a control circuit actuated in response to magnetic flux, and a circuit actuated in response to contact operations, and finally at the bottom of the figure is shown a control circuit actuated in response to heat.

In the first mentioned circuit 41 denotes a light source, 42 a photocell, 43 a transistor amplifier, 44 a control functional unit transmitting On/Off control signals, 45a and 45b denote functional units serving as power amplifiers actuating an electromechanical relay or contactor of which the coil is denoted by 46c and the armature assembly by 46d, as well as another contactor controlled, for example, through a transducer and of which the coils are denoted by 47a and 47b and the armature assembly by 47c.

In the second mentioned circuit 51 denotes a magnetic-flux-producing member, 52 a receiving coil, 53 a transistor amplifier, 54 a control functional unit, 55 a functional unit serving as a power amplifier, 55a the coil of a contactor and 55b the armature assembly of the latter.

In the third-mentioned circuit 61 denotes a contact the closing of which initiates operation of the circuit elements following it, 62 denotes the control functional unit, 63a and 63b denote functional units serving as power amplifiers and 63c and 63e denote magnetic amplifiers having windings 63d and 63f.

Finally in the fourth-mentioned circuit 71 denotes a thermally responsive element which may be connected, for example, to the elements (functional units, contactors) of the circuits mentioned above or to the signal, receiving unit 72 or the signal-deriving unit 73.

In these various examples a pre-amplifier functional unit raises the level of energy too low to effect control actions.

As power amplifiers it is preferred to employ magnetic amplifiers for the last stage.

In the second column from the left of the figure which contains the control functional units, a received signal is transformed into another signal of zero or maximum nature for the control members which appear in the third column and which control the signals and transmit at a higher level the power used in the conventional receiving devices appearing in the fourth column.

In the example of a functional unit shown in FIGURE 11 the same references denote the same parts as in FIGURE 3. There are however several modifications and additions. The capacitor C of FIGURE 3 which shunts $R_4$ is now connected across $R_7$. A resistor $R_{7a}$ is connected in series with a capacitor $C_1$ which serves to bias an electronic relay to its unoperated state.

Whilst, when in parallel with resistor $R_4$, capacitor C introduced the risk of initiating switching in response to variations in the supply voltage, when it is in parallel with resistor $R_7$ this risk is removed and the relay cannot switch fortuitously.

A diode D is connected to the emitter of transistor $T_1$ to limit the effect of the potential at point X and thus to improve the sensitivity of the relay.

A capacitor $C_2$ is connected in parallel with $R_3$ to maintain the level of potential of the emitters during the very short time of switching of the relay independent of possible variations of the voltage across to $R_3$ during switching.

A resistor $R'_9$ shown in dotted lines indicates a possible connection of a resistor symmetrical with $R_9$ for controlling the transistor $T_2$ instead of the transistor $T_1$.

At $X_1$ there is indicated by a dotted line a possible alternative input for the control signal so as to be applied to the emitter instead of the base of $T_1$.

The points E and F connected to the resistors $R_4$ and $R_5$ of FIGURE 3 have been split by three resistors $R_{101}$ to $R_{103}$ in one case and $R_{104}$ to $R_{106}$ in the other to three output terminals each to provide six outlets for signals three for "operate" signals, and three for "release" signals which are sent to the switching inputs of relays. Three similar variations of potential but of contrary sense are received from each side of these outlets. It is thus possible by means of these outlets to control six functions without the need for amplifying the signals before sending them to other functional units. It is obvious that as the points E and F can be divided into three secondary terminals they can also be divided into a greater number of said terminals.

It will be recalled from the consideration of FIGURES 6 and 7 that the signal emitted by a functional unit or resulting from the summation of signals from several units may be transmitted to a following unit through a diode arrangement $D_1$, $D_2$. Under these conditions the signal is continuous, and subsists as long as the functions giving rise to them.

In the modification shown in FIGURE 12, in which appear the resistors $R_{11}$ and $R_{12}$ of FIGURE 6, signals are transmitted by diode $D_1$, $D_2$ to the functional unit indicated schematically at 107, no longer in a continuous fashion but as impulses, by means of a capacitor 108 shunted by a resistor 109. The functional unit 107 receives an impulse switching signal, for example one ordering switching from the unoperated state to the operated state. The signal transmitted is transitory even though the function subsists, owing to the charge on capacitor 108. The absence of the continuous signal does not affect the switching of unit 107 because as previously explained it acts like a locking relay. The relay having switched it is possible to switch it back in response to signals from other sources even if the function which originally switched the relay still subsists. Having regard to the directional property of diode $D_1$, $D_2$ and the fact that the signal had been transmitted from left to right, the arrangement of FIGURE 12 can be considered a control-impulse-signal functional unit.

In comparison with conventional installations in which the functional relays transmit signals by contacts, the functional units so far described can be considered as "motor" elements and the control units as "contact" elements for transmitting the function signals emitted by the "motor" elements.

In the embodiment of FIGURE 13 there is what can be defined as a control-impulse-counter-signal functional unit, having regard once again to the directional property of diode $D_1$, $D_2$ and the passage of signals from right to left, and the transmission of signals as impulses resulting from the provision of capacitor 108a shunted by the resistor 109a.

FIGURES 12 and 13 represent single order signal units but it is nevertheless possible to form multiple order signal units responsive to impulse signals from various sources using an arrangement which may be similar to the left-hand side of FIGURE 8.

The input terminals 110 to 113 (FIGURE 14) represent the output points of a preceding unit. The control unit is fed from resistors 114 corresponding to resistors $R_{28}$ to $R_{30}$ of FIGURE 8. Impulse operation is provided for by capacitors 108 shunted by resistors 109 and the transmission of the signal to the terminals 114 to 117 is ensured by the diodes $D_1$, $D_2$. By virtue of the electrical connections between output terminals 114 to 117 to the or each functional unit beyond the unit shown in FIGURE 14 it is possible to provide AND and OR circuits.

Just as the control unit of FIGURE 14 only transmits order signals, the control unit of FIGURE 15, similar to that of FIGURE 13, only transmits counter-order signals. There are thus before the terminals 118 to 121 at least four functional units sending counter-order signals and behind the terminals 122 to 125 functional units operating only upon receipt of counter-orders.

It has been seen in relation to FIGURE 11 that the outlet points for order signals and counter-order signals connected respectively to resistors $R_4$ and $R_5$ were split into a plurality of terminals for ordering a plurality of functions by virtue of the provision of any desired number of resistors 101 to 106. According to an important modification shown in FIGURE 16, these resistors are replaced by diodes 126 to 131 transmitting to the outlets 132 to 134 and 135 to 137 order signals and counter-order signals respectively to be utilised for various functions.

This replacement of resistors by diodes is of considerable interest. From FIGURES 6 and 7 it will be seen that if the number of resistors $R_{11}$, $R_{21}$, $R_{22}$ or $R_{23}$ is increased theoretically to an infinite number, this ensuring connection between the outputs of any number of functional units, along with a similar increase in the number of diodes $D_1$, $D_2$ for transmitting order signals to following units, the resultant single resistance representing the multiple transmission of order signals is substantially zero. There is at the input to each diode $D_1$, $D_2$ a potential identical with that at the point of control. In these conditions, the diodes are not conductive and no order signal can be transmitted to a following unit. By replacing the resistors by the diodes 126 to 131 it is possible theoretically to multiply to infinity the number of diodes at the output from a functional unit and there will always be at the input to the or each diode of the control unit connected to points 132 to 137 a potential sufficient to cause it to operate, that is to say a potential sufficient to transmit an order signal or a counter-order signal. Once the relay has switched the diodes are no longer conductive.

By way of example there is shown in FIGURE 17 a particular combination of circuits for acting on the final functional unit 138 of a chain, starting from a plurality of functional units 139 to 143, etc. and, transmitting their order signals through diodes 144 to 148, etc., analogous with the diodes 126 to 128 of FIGURE 16. At 149 to 153 there are the connecting terminals of the different functional units similar to the output terminals 132 to 137 of FIGURE 16. In the case illustrated the units 140—142 are connected in an AND combination to the order-signal-transmitting unit 154. Unit 155 is a counter-order-signal unit connected to the functional unit 139, whilst 156 denotes a transmitting unit for individual order signals emitted by the functional unit 143. The units 140 to 143 thus send a functional order signal for switching from "release" to "operate" whilst the unit 139 sends a functional order for switching from "operate" to "release." At the ouput of units 154 and 156 the connection with unit 138 is effected by an OR circuit, that is to say that the relay 138 will switch from "release" to "operate" if the order signal is transmitted by either the unit 154 or the unit 156. The relay 138 may equally fulfil its function when it receives from unit 155 the order signal "release."

At 157 there is shown a resistor connected to the input of the order signal receiving circuit and to a terminal 158. This terminal may be connected to the negative pole of the power supply and element 157 then serves as the resistor for putting the relay 138 to its released state. Alternatively, to the same end, it may be connected to another functional unit which permits unit 138 to transmit order signals in the form of impulses.

The operation of an installation provided with a unit having such a resistor will be described later in connection with FIGURE 21.

In FIGURE 18 there is shown a combination of circuits effected by means of a plurality of functional units and order and counter-order signal units for ordering the function controlled by a relay or unit 160 at the end of a chain. This combination of circuits corresponds to the use of functional units such as those shown in FIGURE 11, of which the order-signal outlet points are split by a plurality of resistors. Each rectangle 161 to 166 to divided into four triangles by two diagonals and the triangles such as 167 and 168 schematically represent respectively an order-signal unit and a counter-order-signal unit. An order-signal arrives from the left by the connection 169 whilst a counter-order signal arrives from the right by the connection 170. The triangles 171 and 172 represent a functional unit connected to the control units 167 and 168. The terminals of triangle 171 transmit the order signal "operate" whilst those of triangle 172 transmit the order "release." It is to be understood that when the functional unit restores to "released" state there will be transmission of counter orders from the terminals of triangle 171 and orders from those of triangle 172. In this way orders and counter orders may be sent from each output point of a functional unit, it being understood that the control unit employed to this end makes a selection as to the nature of the signal transmitted. The units 161 to 166 are connected in two groups of three in an AND combination to the control and functional units 173 and 174 which in their turn are connected by an AND circuit to the function-utilisation relay 160.

As a result of replacing the resistors at the outlets of the functional units by diodes, as described in connection with FIGURE 16, an arrangement such as that shown in FIGURE 19 can be realised, in which the units 161—166 are connected directly by OR circuits to the end-of-chain functional relay 160.

If it is assumed that in the connection 175 the outputs of circuits such as 176 are brought together, providing the functional units situated behind and arranged in an OR combination, and that ten such circuits are brought together in the connection 175 it is possible finally to control the relay 160 by sixty electronic relays which is practically impossible with the arrangement of resistors of FIGURE 18 and moreover with conventional arrangements of electromechanical relays.

Referring now to FIGURE 20 and bearing in mind the description in relation to FIGURE 18, there is here shown an example of a complex interconnection of mixed units 177 to 179 to a functional utilisation unit 180, where the outputs of orders and counter orders for release and operate functions has been multiplied at will. This system is a simplified representation of the multiplicity of combinations which can be realised with the help of the improvements of the invention where it is possible to extract from a functional unit not a single order but a plurality of orders.

A further modification of a continuous-signal functional unit will now be described with reference to FIGURE 21. Whilst the order emitted by unit 181 subsists, unit 182 remains in its operated state whatever the nature of the order emitted by unit 183. If unit 183 is in its operated state and the order emitted by 181 comes to an end, the unit 182 remains in its operated state. The unit 182 has to await the switching of unit 183 to released state before it can itself switch to released state. At this time unit 183 emits in effect a counter order. In the case where 183 has been released, the ending of the order of 181 restores automatically the unit 182 to released state. When the function ordered by 181 ends it is possible to switch to released state. In the case where the resistor 157 is connected to the negative pole of the power supply, the switching to released state of unit 182 occurs on the cessation of the order emitted by the unit 181 and there is thus provided the conventional effect of electromechanical relays.

We claim:

1. A multivibrator circuit arrangement comprising a pair of networks each including a transistor with a base electrode, an emitter electrode and a collector electrode, a first resistive branch connecting said base electrode to a source of emitter potential, a second resistive branch connecting said base electrode to the collector electrode of the other network and forming with said first branch a potentiometer, and resistance means connecting said collector electrode to a source of collector potential, the potentials of said sources and the branches of each potentiometer being so dimensioned as to maintain each of said transistors non-conductive upon the passage of current through the other transistor and the associated resistance means; a common resistor connecting the emitter electrodes of both transistors to said source of emitter potential; and capacitive means unsymmetrically loading one of said networks and including a condenser connected across one of said resistive branches in said one of said networks for preferentially rendering one of said transistors conductive upon completion of the connection from both transistors to said sources of potential.

2. A multivibrator circuit arrangement according to claim 1 wherein said capacitive means is connected across said second resistive branch.

3. A multivibrator circuit arrangement according to claim 1, further comprising switch means in series with said first resistive branch of one of said networks, and auxiliary resistor means connecting the base electrode of the last-mentioned network to said source of collector potential.

4. A multivibrator circuit arrangement according to claim 3 wherein said switch means comprises an auxiliary transistor.

5. A multivibrator circuit arrangement according to claim 1 wherein said capacitive means comprises a condenser and a resistor in series.

6. A multivibrator circuit arrangement according to claim 5 wherein said capacitive means is connected across said first resistive branch.

7. A multivibrator circuit arrangement according to claim 1, further comprising condenser means connected across said common resistor.

8. A multivibrator circuit arrangement comprising a pair of networks each including a transistor with a base electrode, an emitter electrode and a collector electrode, a first resistive branch connecting said base electrode to a source of emitter potential, a second resistive branch connecting said base electrode to the collector electrode of the other network and forming with said first branch a potentiometer, and resistance means connecting said collector electrode to a source of collector potential, the potentials of said sources and the branches of each potentiometer being so dimensioned as to maintain each of said transistors nonconductive upon the passage of current through the other transistor and the associated resistance means; a common resistor connecting the emitter electrodes of both transistors to said source of emitter potential; capacitive means unsymmetrically loading one of said networks and including a condenser connected across one of said resistive branches in said one of said networks for preferentially rendering one of said transistors conductive upon completion of the connection from both transistors to said sources of potential; and an input circuit connected to one of the electrodes of at least one of said networks for transmitting signals adapted to reverse the state of conductivity of the transistors.

9. A multivibrator circuit arrangement according to claim 8 wherein said input circuit comprises a plurality of impedance branches connected between said one of the electrodes and respective input terminals.

10. A multivibrator circuit arrangement according to claim 9 wherein said impedance branches comprise respective diodes.

11. A multivibrator circuit arrangement according to claim 8 wherein said one of the electrodes is a collector electrode.

12. A multivibrator circuit arrangement according to claim 8 wherein said input circuit comprises a capacitor shunted by a resistor for converting continuous signals into transients.

References Cited in the file of this patent

UNITED STATES PATENTS

| | | |
|---|---|---|
| 2,622,212 | Anderson | Dec. 16, 1952 |
| 2,787,712 | Priebe | Apr. 2, 1958 |
| 2,903,605 | Barney | Sept. 8, 1959 |
| 2,918,587 | Rector | Dec. 22, 1959 |
| 2,970,230 | Adams | Jan. 31, 1961 |